United States Patent
Osamura

(10) Patent No.: US 11,216,229 B2
(45) Date of Patent: Jan. 4, 2022

(54) INFORMATION PROCESSING APPARATUS, NON-TRANSITORY COMPUTER READABLE MEDIUM STORING PROGRAM, AND MANAGEMENT SYSTEM

(71) Applicant: FUJIFILM Business Innovation Corp., Tokyo (JP)

(72) Inventor: Toru Osamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 320 days.

(21) Appl. No.: 16/168,854

(22) Filed: Oct. 24, 2018

(65) Prior Publication Data

US 2019/0129668 A1    May 2, 2019

(30) Foreign Application Priority Data

Nov. 1, 2017    (JP) .............................. JP2017-211820

(51) Int. Cl.
*G06F 3/12*      (2006.01)
*H04N 1/00*    (2006.01)
*G06F 9/54*    (2006.01)

(52) U.S. Cl.
CPC .......... *G06F 3/1261* (2013.01); *G06F 3/1212* (2013.01); *G06F 3/1238* (2013.01); *G06F 3/1255* (2013.01); *G06F 3/1273* (2013.01); *G06F 9/542* (2013.01); *H04N 1/00344* (2013.01); *G06F 3/12* (2013.01); *G06F 3/1204* (2013.01)

(58) Field of Classification Search
CPC .... G06F 3/1261; G06F 3/1212; G06F 3/1273; G06F 3/1255; G06F 9/542; G06F 3/1238; G06F 3/1268; G06F 3/1267; G06F 3/1222; G06F 3/1285; G06F 3/12; G06F 3/1204; H04N 1/00344
USPC ........................................................ 358/1.15
See application file for complete search history.

(56) References Cited

U.S. PATENT DOCUMENTS

| | | | |
|---|---|---|---|
| 2014/0189015 A1* | 7/2014 | Chan ..................... | G06Q 10/107 709/204 |
| 2015/0199141 A1* | 7/2015 | Faulkner ............. | G06F 11/3419 711/103 |
| 2017/0046374 A1* | 2/2017 | Fletcher ................ | G06F 3/0482 |
| 2017/0220633 A1* | 8/2017 | Porath ..................... | G06F 9/542 |

FOREIGN PATENT DOCUMENTS

JP        2004348085        12/2004

* cited by examiner

*Primary Examiner* — Miya J Williams
*Assistant Examiner* — Darryl V Dottin
(74) *Attorney, Agent, or Firm* — JCIPRNET

(57) ABSTRACT

An information processing apparatus includes an extraction section that extracts delayed processing having a waiting time which is longer than a predetermined time, from a use history of each of plural users using plural processing devices, the waiting time being a time from performing of an instruction to perform processing to starting of performing the processing, an analysis section that analyzes a cause of the delayed processing, and a notification section that notifies the user who has performed an instruction to perform the delayed processing, of at least one of an analysis result obtained by the analysis section or a countermeasure based on the analysis result.

17 Claims, 12 Drawing Sheets

FIG. 9

|  | USER | INSTRUCTION TIME POINT | START TIME POINT | WAITING TIME | USED DEVICE | USED FUNCTION |
|---|---|---|---|---|---|---|
| PROCESSING 1 | A | 09:00:00 | 09:01:10 | 70 SECONDS | 12E | COLOR PRINTING |
| PROCESSING 2 | A | 09:01:10 | 09:02:10 | 60 SECONDS | 12E | COLOR PRINTING |
| PROCESSING 3 | A | 09:50:10 | 09:50:55 | 45 SECONDS | 12E | COLOR PRINTING |
| PROCESSING 4 | A | 09:30:20 | 09:31:00 | 40 SECONDS | 12E | FAX |
| PROCESSING 5 | B | 09:30:05 | 09:30:40 | 35 SECONDS | 12E | FAX |
| PROCESSING 6 | B | 09:00:55 | 09:01:25 | 30 SECONDS | 12E | COLOR PRINTING |
| PROCESSING 7 | C | 09:01:00 | 09:01:40 | 40 SECONDS | 12E | COLOR PRINTING |
| PROCESSING 8 | C | 09:29:50 | 09:30:20 | 30 SECONDS | 12E | FAX |
| PROCESSING 9 | D | 09:29:30 | 09:30:00 | 30 SECONDS | 12E | FAX |
| PROCESSING 10 | D | 09:01:05 | 09:01:55 | 50 SECONDS | 12E | COLOR PRINTING |

FIG. 12

| PROCESSING DEVICE | FUNCTION X (BLACK-AND-WHITE PRINTING) | FUNCTION Y (COLOR PRINTING) | FUNCTION Z (FAX) |
|---|---|---|---|
| 12N | PROVIDED | NONE | NONE |
| 12W | PROVIDED | PROVIDED | NONE |
| 12E | PROVIDED | PROVIDED | PROVIDED |
| 12S | PROVIDED | NONE | NONE |

FIG. 13

| PROCESSING DEVICE | USER A | USER B | USER C | USER D |
|---|---|---|---|---|
| 12N | LEVEL 1 | LEVEL 2 | LEVEL 2 | LEVEL 1 |
| 12W | LEVEL 2 | LEVEL 2 | LEVEL 3 | LEVEL 2 |
| 12E | LEVEL 3 | LEVEL 3 | LEVEL 3 | LEVEL 3 |
| 12S | LEVEL 2 | LEVEL 1 | LEVEL 1 | LEVEL 2 |

*LEVEL 3 ··· ALLOWED TO USE COLOR PRINTING FUNCTION
*LEVEL 2 ··· NOT ALLOWED TO USE COLOR PRINTING FUNCTION
*LEVEL 1 ··· NOT ALLOWED TO USE DEVICE

FIG. 14

|   | USER | USED DEVICE | USED FUNCTION | TIME ZONE | WAITING TIME | ALTERNATIVE DEVICE |
|---|---|---|---|---|---|---|
| 1 | A,B,C,D | 12E | COLOR PRINTING | 09:00–10:00 | 40 TO 60 SECONDS | 12W |
| 2 | A,B,C,D | 12E | FAX | 09:00–10:00 | 30 TO 40 SECONDS | NONE |

FIG. 15
| PROCESSING DEVICE | USER A | USER B | USER C | USER D |
|---|---|---|---|---|
| 12N | $T_{m1}$ | $T_{m5}$ | $T_{m9}$ | $T_{m13}$ |
| 12W | $T_{m2}$ | $T_{m6}$ | $T_{m10}$ | $T_{m14}$ |
| 12E | $T_{m3}$ | $T_{m7}$ | $T_{m11}$ | $T_{m15}$ |
| 12S | $T_{m4}$ | $T_{m8}$ | $T_{m12}$ | $T_{m16}$ |
FIG. 16
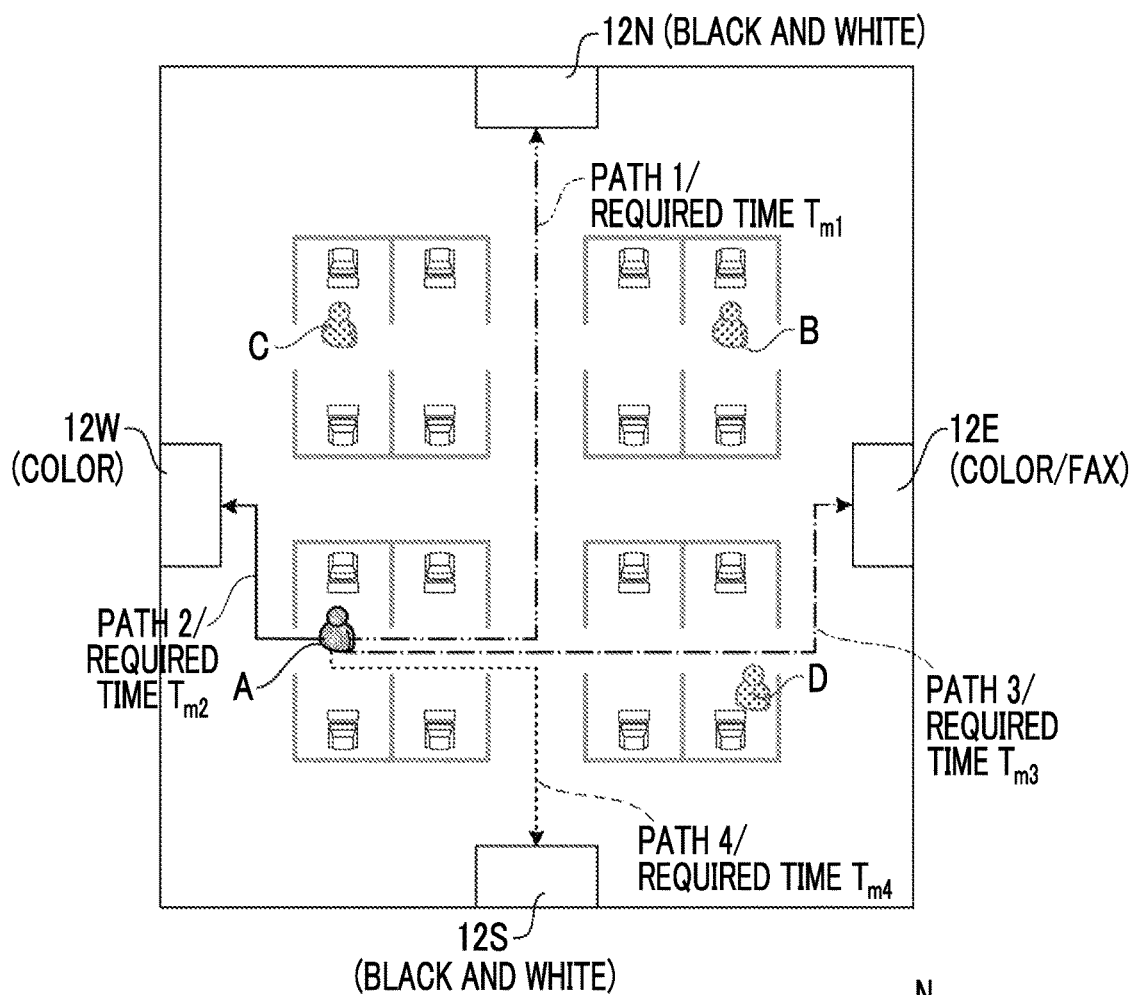
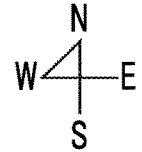

FIG. 17
| | USER | USED DEVICE | USED FUNCTION | MOVING TIME |
|---|---|---|---|---|
| 1 | A | 12E | COLOR PRINTING | $T_{m3}$ |
FIG. 18
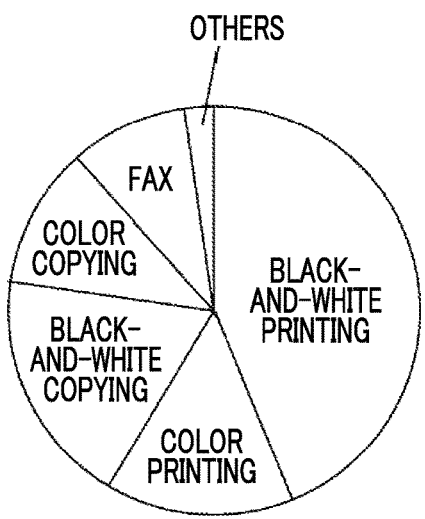
FIG. 19
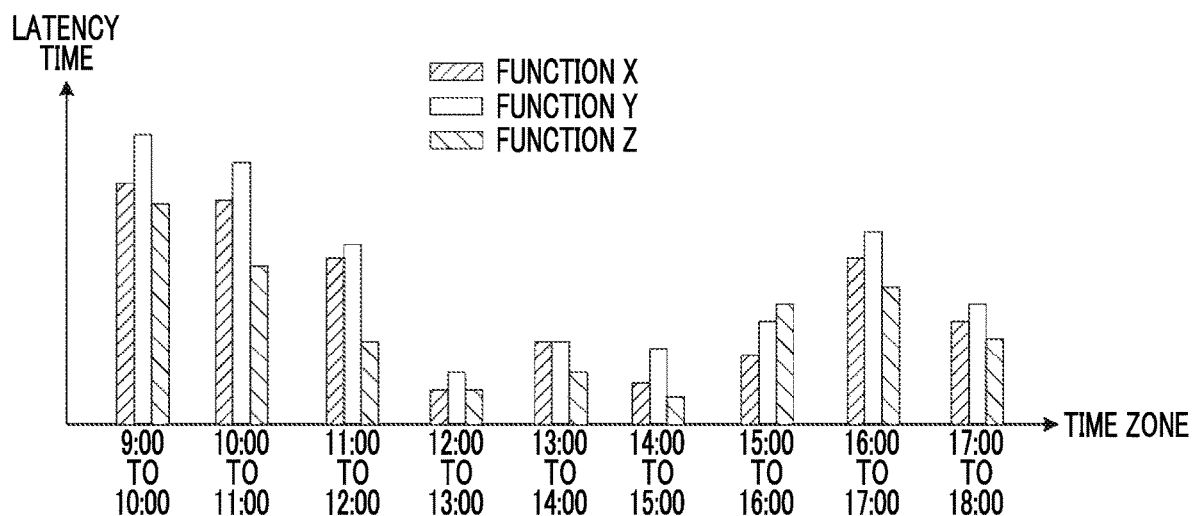

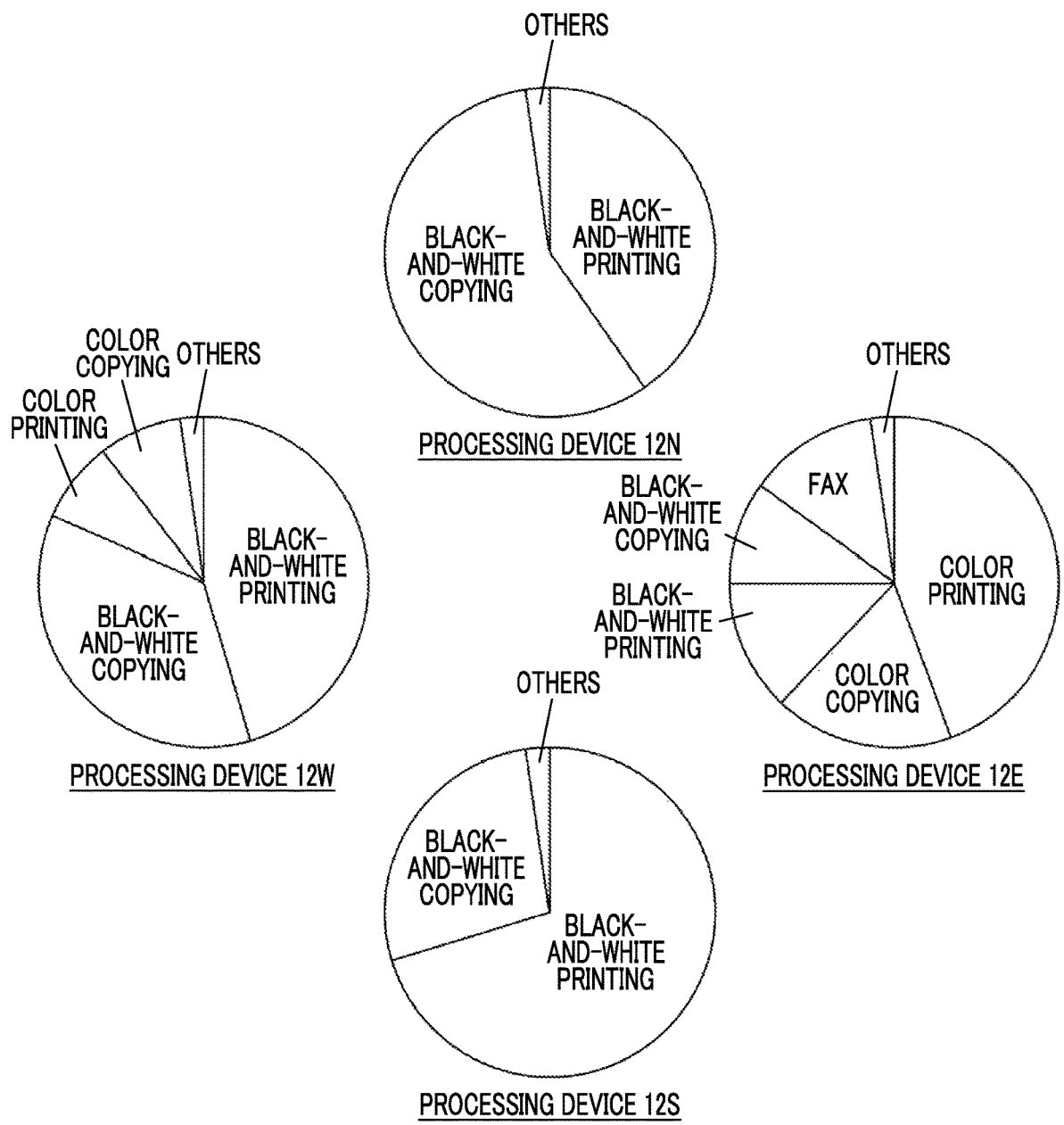

INFORMATION PROCESSING APPARATUS, NON-TRANSITORY COMPUTER READABLE MEDIUM STORING PROGRAM, AND MANAGEMENT SYSTEM

CROSS-REFERENCE TO RELATED APPLICATIONS

This application is based on and claims priority under 35 USC 119 from Japanese Patent Application No. 2017-211820 filed Nov. 1, 2017.

BACKGROUND

Technical Field

The present invention relates to an information processing apparatus, a non-transitory computer readable medium storing a program, and a management system.

SUMMARY

According to an aspect of the invention, there is provided an information processing apparatus which includes an extraction section that extracts delayed processing having a waiting time which is longer than a predetermined time, from a use history of each of plural users using plural processing devices, the waiting time being a time from performing of an instruction to perform processing to starting of performing the processing, an analysis section that analyzes a cause of the delayed processing, and a notification section that notifies the user who has performed an instruction to perform the delayed processing, of at least one of an analysis result obtained by the analysis section or a countermeasure based on the analysis result.

BRIEF DESCRIPTION OF THE DRAWINGS

Exemplary embodiment(s) of the present invention will be described in detail based on the following figures, wherein:

FIG. 9 is a diagram illustrating an example of a delayed processing list;

FIG. 12 is a table illustrating an example of information regarding a function of each of plural processing devices;

FIG. 13 is a table illustrating an example of pieces of authority information of plural users for each of the plural processing devices;

FIG. 14 is a diagram illustrating an example of a processing concentration list;

FIG. 15 is a table illustrating an example of information regarding a required time to each of the plural processing devices;

FIG. 16 is a plan view illustrating a path from a user A to each of the processing devices;

FIG. 17 is a diagram illustrating an example of an inconvenient use list;

FIG. 18 is a graph illustrating a use ratio of each function in the entirety of the system;

FIG. 19 is a graph illustrating a latency time of each function for each time zone; and FIG. 20 is a graph illustrating a use ratio of each function for each device.

DETAILED DESCRIPTION

Hereinafter, an example of an exemplary embodiment of the present invention will be described in detail with reference to the drawings.

Management System

Firstly, a management system according to an exemplary embodiment of the present invention will be described.

Figure 1:
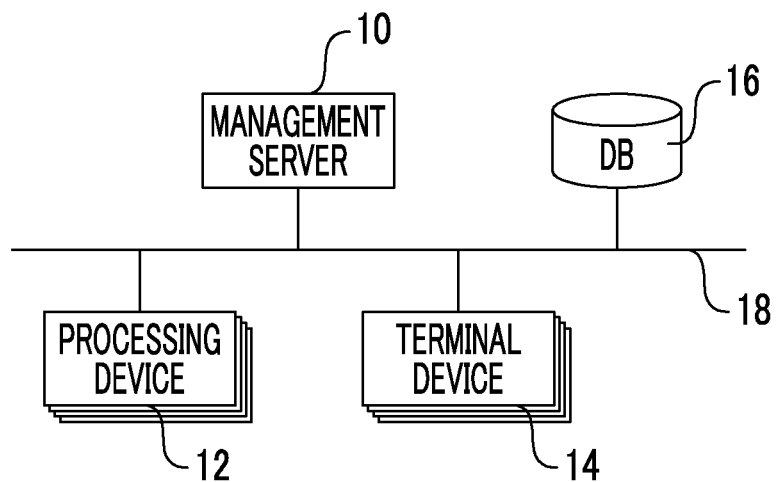
FIG. 1 is a block diagram illustrating an example of a configuration of a management system.

FIG. 1 is a block diagram illustrating an example of a configuration of the management system. As illustrated in FIG. 1, the management system according to the exemplary embodiment includes a management server 10, plural processing devices 12 managed by the management server 10, plural terminal devices 14 which are respectively used by plural users, and a storage device 16 disposed on the outside of the management server 10. The management server 10, the plural processing devices 12, the plural terminal devices 14, and the storage device 16 are connected to a communication line 18 so as to transmit and receive information to and from each other via the communication line 18. The management server 10 is an example of "an information processing apparatus".

In the exemplary embodiment, a user requests the plural processing devices 12 to perform processing, via the terminal device 14 used by the user. Each of the plural processing devices 12 performs the requested processing and records a use history for each piece of processing. The recorded use history is held in a storage device of each of the processing devices and is also copied to the storage device 16. The management server 10 manages processing states of the plural processing devices 12 such that pieces of processing are efficiently performed in the entirety of the system.

Specifically, the management server 10 acquires use histories of the plural processing devices from the storage device 16 and extracts delayed processing having a waiting time longer than that in a normal case. The management server 10 analyzes the cause of processing being delayed, for each extracted delayed processing. The management server 10 notifies the user of at least one of an analysis result or a countermeasure. The management server 10 notifies a manager of an inefficient use situation, for example, uses which are concentrated on a specific processing device or an inconvenient use of a specific user.

Management Server

Next, the management server will be described.

Figure 2:
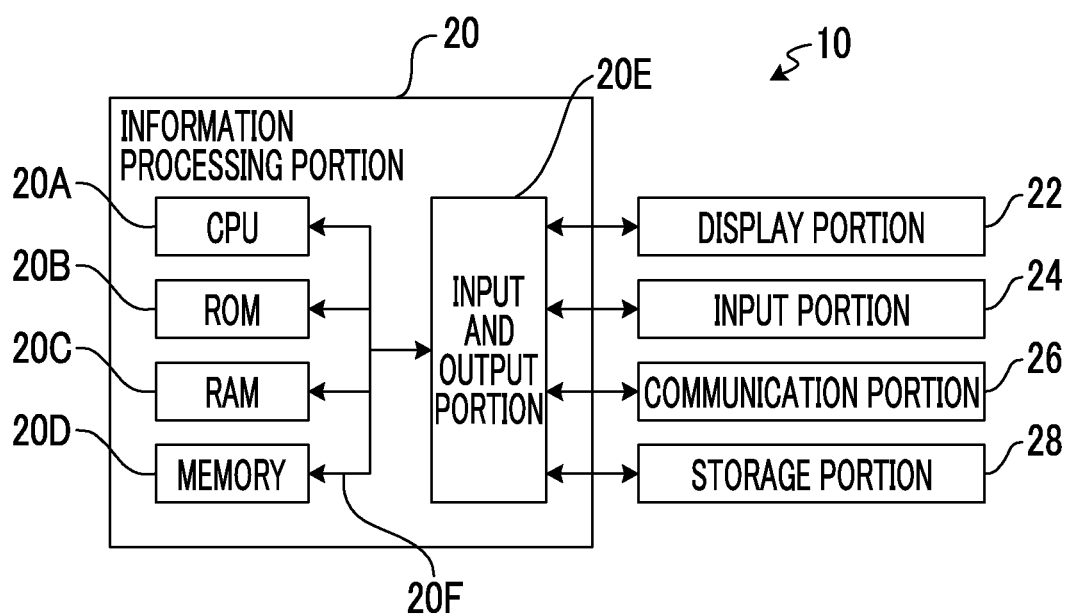
FIG. 2 is a block diagram illustrating an example of an electrical configuration of a management server.

FIG. 2 is a block diagram illustrating an example of an electrical configuration of the management server. As illustrated in FIG. 2, the management server 10 includes an information processing portion 20. The information processing portion 20 is configured as a computer that controls the entirety of the server and performs various operations. That is, the information processing portion 20 includes a central processing unit (CPU) 20A, a read only memory (ROM) 20B, a random access memory (RAM) 20C, a nonvolatile memory 20D, and an input and output portion (I/O) 20E.

The CPU 20A, the ROM 20B, the RAM 20C, the memory 20D, and the I/O 20E are connected to each other via a bus 20F. For example, the CPU 20A reads a program stored in the ROM 20B and executes the program by using the RAM 20C as a work area. A display portion 22 such as a display, an input portion 24 such as a keyboard or a mouse, a communication portion 26, and a storage portion 28 are connected to the I/O 20E of the information processing portion 20.

The communication portion 26 is an interface for communicating with an external device via a wired or wireless communication line. For example, the communication portion functions as an interface for communicating with the external device such as a computer, which is connected to a network such as a local area network (LAN) or the Internet. The storage portion 28 is an external storage device such as a hard disk.

In the exemplary embodiment, a case where various programs such as "an efficiency improvement processing program" which will be described later are stored in the ROM 20B will be described. However, a storage area of the program is not limited to the ROM 20B. The various programs may be stored in other storage devices such as the memory 20D or the storage portion 28 and may be acquired from the external device via the communication portion 26.

Various drives may be connected to the information processing portion 20. The various drives are devices that read data from a computer-readable portable recording medium such as a CD-ROM and a universal serial bus (USB) memory or write data in the recording medium. In a case of including the various drives, the program may be recorded in a portable recording medium and may be read and executed by the drive corresponding to the recording medium.

Terminal Device

The electrical configuration of the terminal device is the same as that of the management server, and thus descriptions thereof will not be repeated.

Processing Device

Next, the processing device will be described.

The processing device is a device that performs processing in accordance with an instruction from a user. In the exemplary embodiment, the processing device is a multifunctional device having various functions, for example, as follows: a printing function of forming an image corresponding to image data on paper; a scanner function of reading an image formed on paper, as image data; a facsimile function of transmitting image data to another image processing device connected to a public line or the like; and a copying function of copying an image formed on paper, to another piece of paper.

Figure 3:
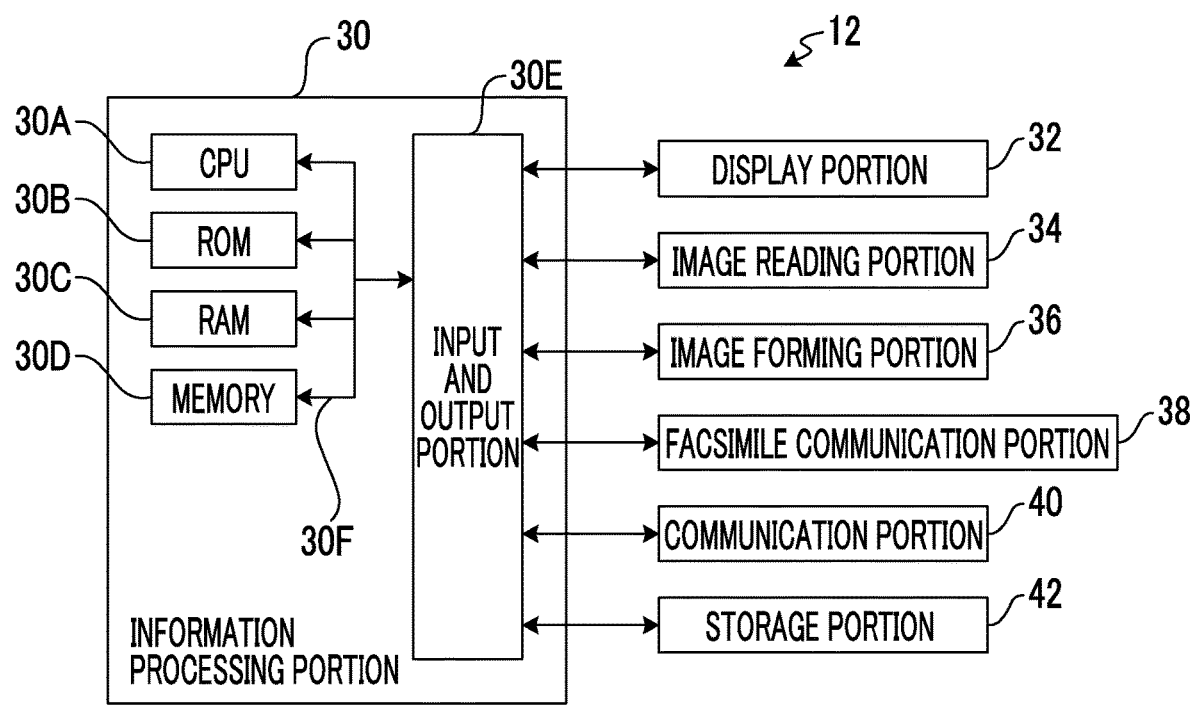
FIG. 3 is a block diagram illustrating an example of an electrical configuration of a processing device.

FIG. 3 is a block diagram illustrating an example of an electrical configuration of the processing device. As illustrated in FIG. 3, the processing device 12 includes an information processing portion 30. The information processing portion 30 is configured as a computer that controls the entirety of the server and performs various operations. That is, the information processing portion 30 includes a CPU 30A, a ROM 30B, a RAM 30C, a memory 30D, and an I/O 30E.

The CPU 30A, the ROM 30B, the RAM 30C, the memory 30D, and the I/O 30E are connected to each other via a bus 30F. For example, the CPU 30A reads a program stored in the ROM 30B and executes the program by using the RAM 30C as a work area. In the exemplary embodiment, the processing device 12 is a multifunctional device having plural functions. An operation display portion 32, an image reading portion 34, an image forming portion 36, a facsimile communication portion 38, a communication portion 40, and a storage portion 42 are connected to the I/O 30E of the information processing portion 30.

The operation display portion 32 includes various buttons, an operation panel for displaying various screens, and the like. With the configuration, the operation display portion 32 receives an operation from a user and displays various kinds of information for the user.

The image reading portion 34 includes an image reader such as a line sensor. With the configuration, the image reading portion 34 reads an image recorded on an original document and outputs image data obtained by reading the image to the CPU 30A via the I/O 30E.

The image forming portion 36 forms an image on paper based on image data. An image forming method may be an electrophotographic method or an ink jet method. For example, in a case of forming an image by an electrophotographic method, the image forming portion 36 includes an image forming unit, a fixing device, and the like. The image forming unit includes a photosensitive drum, a charging device, an exposure device, a developing device, a transferring device, a cleaning device, and the like.

The facsimile communication portion 38 transmits and receives a facsimile message. The communication portion 40 is an interface for communicating with an external device via a wired or wireless communication line. The storage portion 42 is an external storage device such as a hard disk. In the following descriptions, the facsimile function is abbreviated as "the FAX function".

Arrangement Example

Next, an environment in which plural processing devices are used by plural users will be described.

Figure 4:
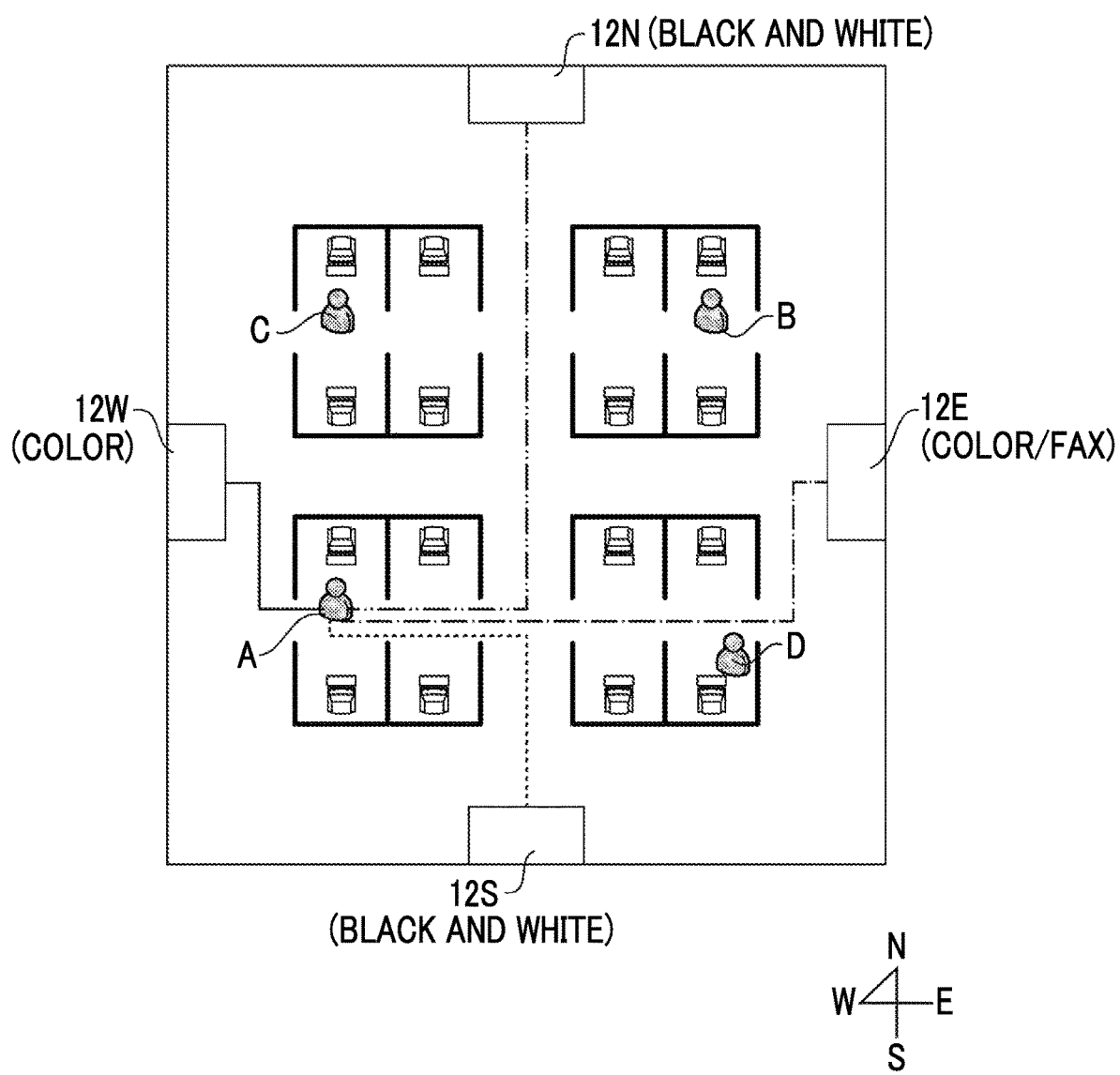
FIG. 4 is a plan view illustrating an arrangement example of the processing device and a user.

FIG. 4 is a plan view illustrating an arrangement example of processing devices and users. As illustrated in FIG. 4, in an area illustrated, there are four users A, B, C, and D and four processing devices 12N, 12W, 12E, and 12S are disposed. In the area illustrated, four terminal devices used by the users A, B, C, and D are arranged. The four processing devices 12 are distinguished from each other by using letters representing cardinal directions. In a case where distinguishment of the processing devices from each other is not required, the processing devices are collectively referred to as the processing device 12.

The processing device 12N is a multifunctional device which does not have a color printing function and the FAX function and is disposed on the north side of the area. The processing device 12W is a multifunctional device which includes the color printing function but does not include the FAX function. The processing device 12W is disposed on the west side of the area. The processing device 12E is a multifunctional device which includes the color printing function and the FAX function and is disposed on the east side of the area. The processing device 12S is a multifunctional device which does not have a color printing function and the FAX function and is disposed on the south side of the area.

The seat of the user A is close to the processing device 12W on the west side of the south. The seat of the user B is close to the processing device 12E on the east side of the north. The seat of the user C is close to the processing device 12W on the west side of the north. The seat of the user D is close to the processing device 12E on the east side of the south. The seats of the users are separated from each other by partitions, and passages are formed along the partitions.

For example, it is assumed that the user performs color printing with the processing device 12E on the east side five times and performs black-and-white printing with the processing device 12W on the west side one time per day. The color printing may also be performed by the processing device 12W which is on the west side and is close to the seat of the user A. However, the user A does not perform the color printing with the processing device 12W on the west side.

This case is considered as an inefficient use situation of the user A, from various viewpoints. For example, this case is considered as "an inconvenient use" in which a frequency of using the processing device 12E which is on the east side and is far from the user A is high and a moving time is long. In addition, this case is considered as "a mismatched use", for example, in which black-and-white printing is performed with the processing device 12W which includes the color printing function and is on the west side. In addition, "a concentrated use" occurs in the processing device 12E on the east side. Because of "the mismatched use" or "the concentrated use", pieces of processing may be concentrated on the specific processing device 12 and a processing time may increase.

In the exemplary embodiment, such an inefficient use situation is extracted from the use history of each of the plural processing devices 12, as "delayed processing" which will be described later. The cause of delay is analyzed for each piece of "the delayed processing" and the user is notified of at least one of the analysis result or the countermeasure. For example, in the above case, the user A is informed that color printing may be also performed by the processing device 12W on the west side. The specific procedures will be described later.

Delay of Processing

Next, delay of processing will be described.

As described above, each of the plural processing devices 12 performs processing in response to a request from a user. Each of the plural processing devices 12 records plural steps from performing of an instruction to perform processing to an end of the processing and leaves the recorded steps as a use history.

Figure 5:
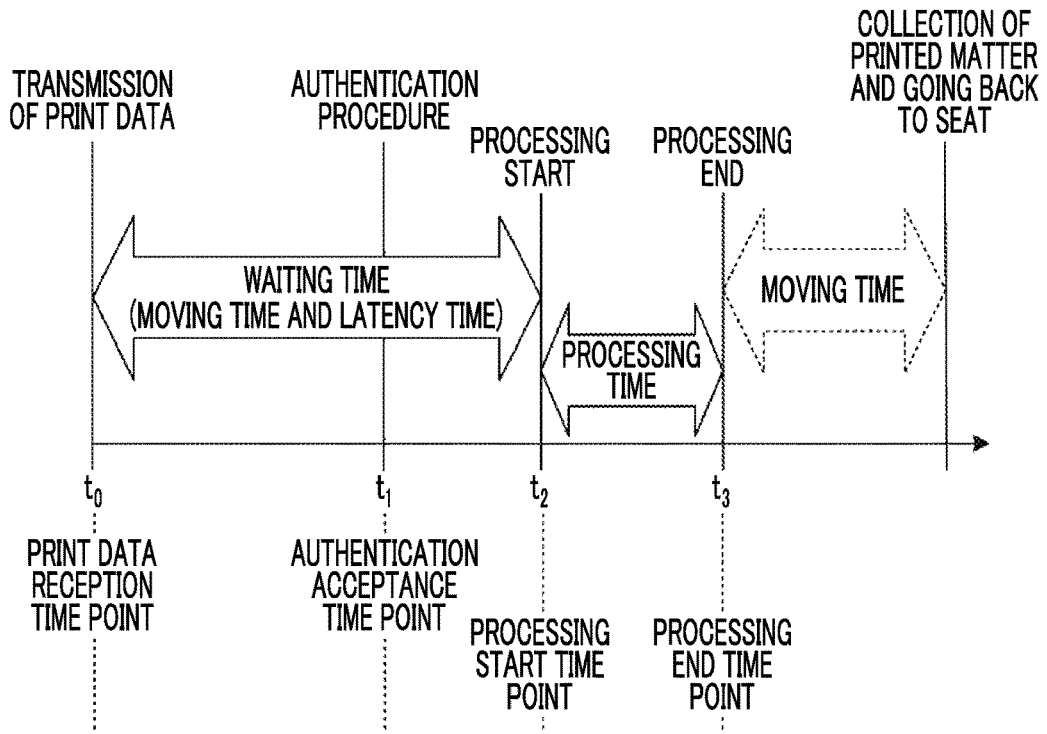
FIG. 5 is a time chart illustrating an example of a relationship between a processing step and a use history of accumulation printing in time series.

FIG. 5 is a time chart illustrating an example of a relationship between the processing step and the use history of accumulation printing in time series. The accumulation printing is printing processing using an accumulation function. In a case where "accumulation printing" is designated in print data, printing processing is not performed and print data is stored in the storage portion (not illustrated), until a user is authenticated by the processing device. In a case where the user is authenticated by the processing device, printing processing is started.

In a case of accumulation printing, firstly, a user transmits print data to the processing device 12 from the terminal device 14 and instructs the processing device 12 to perform processing. Then, the user goes to a place in which the processing device 12 is disposed and performs an authentication procedure, for example, presenting identification information (ID) or a password. After the authentication procedure, performing the processing as a target of the instruction from the processing device 12 is started. Then, the processing is ended. Finally, the user collects a printed matter from the processing device 12 and goes back to the own seat.

In the processing device 12, for example, a reception time point $t_0$ of print data, an authentication acceptance time point $t_1$, a processing start time point $t_2$, and a processing end time point $t_3$ are recorded as the use history, in addition to "user name" of the user A or the like and "function to be used" such as color printing, black-and-white printing, and FAX transmission. In a case where a face authentication camera is mounted in the processing device, a time point at which the face of the user has been recognized is also recorded as the use history.

Here, a time from performing of an instruction to perform processing to an end of the processing is defined as "a waiting time". It is determined whether or not an instruction to perform processing is performed, based on determination of whether or not the processing device recognizes the instruction. For example, in the printing processing, it is recognized that an instruction to perform processing has been performed, by the processing device receiving print data.

The processing time is a time from starting of performing processing (in the following descriptions, simply referred to as "start of processing") to end of the processing. The processing time is determined in accordance with a load of processing, for example, a seconds in a case of one page and 100 a seconds in a case of 100 pages. The processing time for one page is determined in accordance with the function to be used, such as black-and-white printing, color printing, and FAX transmission. However, the waiting time increases due to various circumstances.

For example, in a case where a distance from the terminal device 14 used by the user to the processing device 12 is long, a time to perform the authentication procedure becomes long. In a case where the user is required to wait because another user is using the processing device 12 even though the user goes to a place in which the processing device 12 is disposed, a time to perform the authentication procedure becomes delayed.

In a case where the user is required to wait because another user is using the processing device 12 even after the user has performed the authentication procedure, a time to start processing becomes long. In a case of making descriptions using the FAX function as an example, processing as a target of an instruction from the user is not started until FAX transmission as a target of an instruction which has been previously performed ends.

Figure 6:
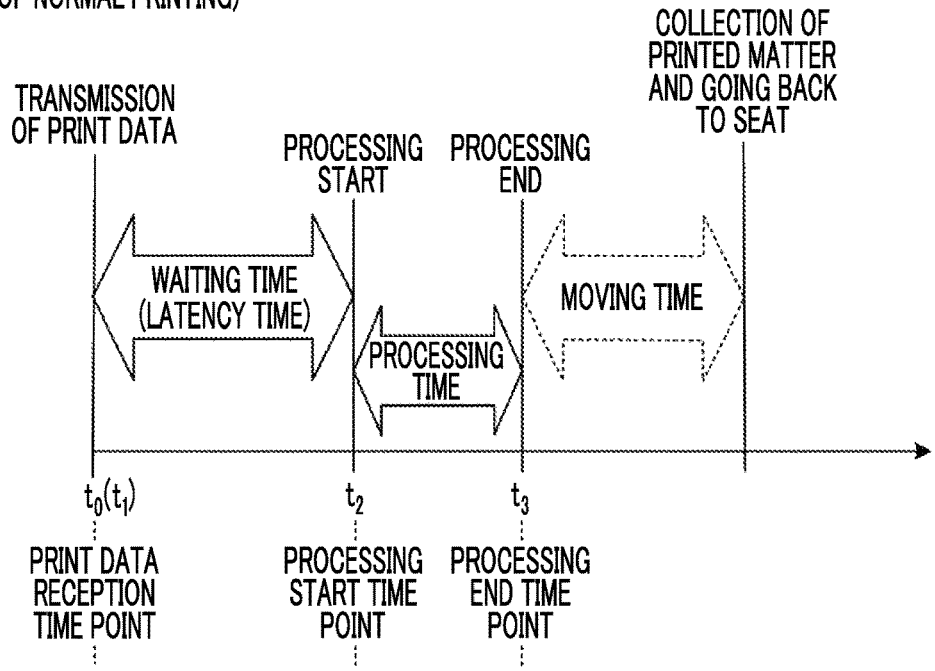
FIG. 6 is a time chart illustrating an example of a relationship between a processing step and a use history of normal printing in time series.

FIG. 6 is a time chart illustrating an example of a relationship between a processing step and a use history of normal printing in time series. In normal printing, in a case where print data is received, performing printing processing is started. In a case of normal printing, firstly, a user transmits print data to the processing device 12 from the terminal device 14 and instructs the processing device 12 to perform processing. After an instruction to perform the processing has been performed, the processing requested by the processing device 12 is started and then ends. Finally, the user collects a printed matter from the processing device 12 and comes back to the seat.

In the processing device 12, a reception time point $t_0$ of print data, a processing start time point $t_2$, and a processing end time point $t_3$ are recorded as the use history, in addition to the user name of the user and the function to be used. In the normal printing, the "waiting time" from performing of an instruction to perform processing to starting of performing the processing also increases by various circumstances. For example, similar to accumulation printing, in a case where the user is required to wait because another user is using the processing device 12, a time to start the processing becomes long.

Program

Next, "the efficiency improvement processing program" will be described.

Figure 7:
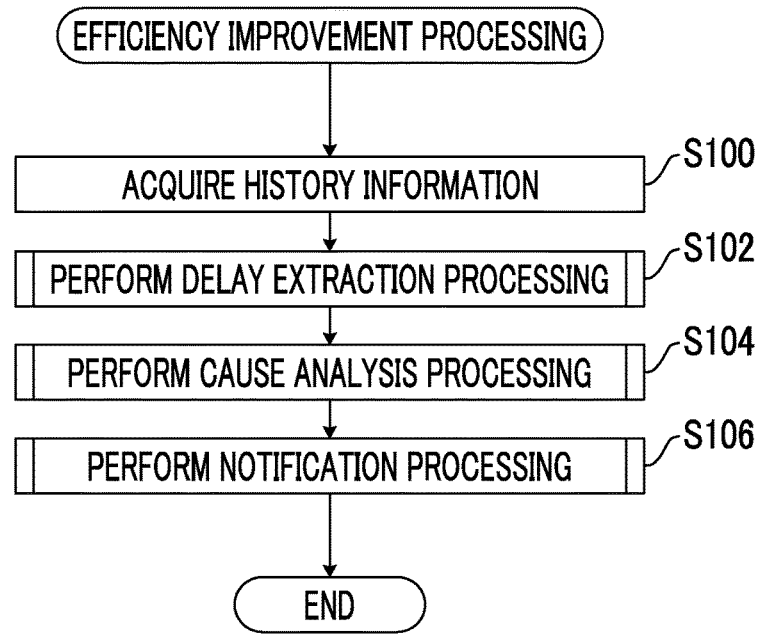
FIG. 7 is a flowchart illustrating an example of a processing flow of "an efficiency improvement processing program"

FIG. 7 is a flowchart illustrating an example of a flow of processing of "the efficiency improvement processing program". "An information transmission processing program" is stored in the ROM 20B of the management server 10. In a case where an instruction to start execution of the program is performed by a user, "the efficiency improvement processing program" is read from the ROM 20B and executed by the CPU 20A of the management server 10.

Firstly, in Step 100, use histories of the plural processing devices are acquired from the storage device 16. The use history in a predetermined range such as a period of one hour, one day, or one week is acquired in accordance with the purpose. For example, in a case where an environment in which plural processing devices are used by plural users corresponds to an office, the use history for a time zone such as a starting time and a closing time, in which the processing device is highly required, may be acquired.

Then, in Step 102, "delay extraction processing" as an example of extraction means is performed. In the delay extraction processing, processing having a waiting time longer than that in a normal case is extracted. The waiting time required for the processing is compared to a threshold and processing having a waiting time which is equal to or greater than the threshold is referred to as "the delayed processing". Then, in Step 104, "cause analysis processing" as an example of analysis means is performed. In the cause analysis processing, the cause of processing being delayed is analyzed for each extracted piece of delayed processing.

In Step 106, "notification processing" is performed and then the routine is ended. In the notification processing, the user is notified of at least one of the analysis result or the countermeasure and the manager is notified of an occurrence of an inefficient use situation. The CPU 20A that performs "the delay extraction processing" corresponds to an example of "the extraction section". The CPU 2 OA that performs "the cause analysis processing" corresponds to an example of "the analysis section". The CPU 20A that performs the notification processing corresponds to an example of "a notification section". Each piece of processing will be described below in detail.

Delay Extraction Processing

Next, the delay extraction processing will be described in detail.

Figure 8:
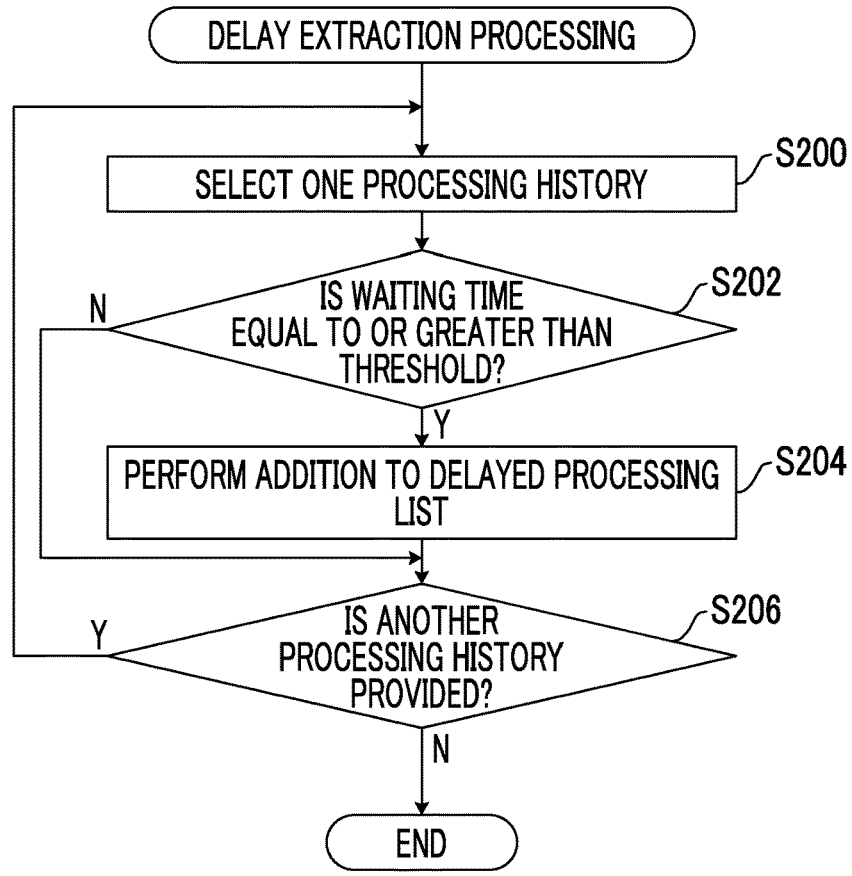
FIG. 8 is a flowchart illustrating an example of a flow of "delay extraction processing"

FIG. 8 is a flowchart illustrating an example of a flow of the delay extraction processing. In the exemplary embodiment, use histories of plural processing devices, which are generated by plural users are acquired, respectively. Here, the use history for each piece of processing is referred to as "a processing history".

As illustrated in FIG. 8, firstly, in Step 200, one processing history is selected. Use histories are organized so as to be allowed to be searched. For example, the processing histories of the processing devices may be selected in order of the processing devices 12N→12W→12E→12S. The processing histories for the users may be selected in order of, for example, the users A→B→C→D. Here, the processing history of each user is selected in order of the users A→B→C→D.

Then, in Step 202, it is determined whether or not the waiting time is equal to or longer than the threshold (predetermined time). A case where the waiting time is short and processing is started just after an instruction to perform the processing has been performed is ideal. However, since the waiting time may include the moving time in accordance with the function to be used, a time such as "XX seconds" is predetermined as the threshold.

The threshold may be determined qualitatively from the sense of the user, for example, the user may set a time at which the user feels "the processing is slow" as the threshold. The threshold may be determined based on the use history, for example, the threshold may be set to be a value based on the representative value of the waiting time obtained from the use histories. The representative value includes the maximum value, the minimum value, an average value, a median value, a mode value, and the like. For example, the threshold is set to be a time longer than the average value by YY seconds.

As described above, processing having a waiting time which is equal to or greater than the threshold is referred to as "the delayed processing". In a case where the delayed processing is extracted, the process proceeds to Step 204. Then, in Step 204, a processing history of the processing determined to be the delayed processing is added to "a delayed processing list". In a case where the delayed processing is not extracted, and Step 204 is skipped, and the process proceeds to Step 206.

In Step 206, it is determined whether or not another processing history is provided. In a case where another processing history is not provided, the routine is ended. In a case where another processing history is provided, the process returns to Step 200 and the procedure from Step 200 to Step 206 is repeated until it is determined whether or not each of pieces of processing for all processing histories is the delayed processing.

In a case where performing the delay extraction processing ends, the delayed processing list is completed. The delayed processing list is stored in the RAM 20C and the storage portion 28 of the management server 10 and the storage device 16. FIG. 9 is a diagram illustrating an example of the delayed processing list. As illustrated in FIG. 9, four pieces of delayed processing are provided for the user A and two pieces of delayed processing are provided for each of the users B, C, and D. The delayed processing is numbered in order of being added to the list, for example, Processing 1 and Processing 2.

For example, Processing 1 is added as the delayed processing because the waiting time is 70 seconds, long when the user A uses the color printing function of the processing device 12E at 9 o'clock. A case of the delayed processing list will be described later. In this example, the threshold is set to 30 seconds regardless of the type of the function such as color printing or FAX transmission and processing having a waiting time which is equal to or greater than 30 seconds is set to be "the delayed processing".

Cause Analysis Processing

Next, "the cause analysis processing" will be described. The waiting time includes "a latency time" and "a moving time". "The latency time" is generated by processing being concentrated on a specific processing device. "The moving time" becomes longer as a distance from a user to the processing device is increased. Separating "the latency time" and "the moving time" from each other is difficult, but the cause of delay is specified.

Figure 10:
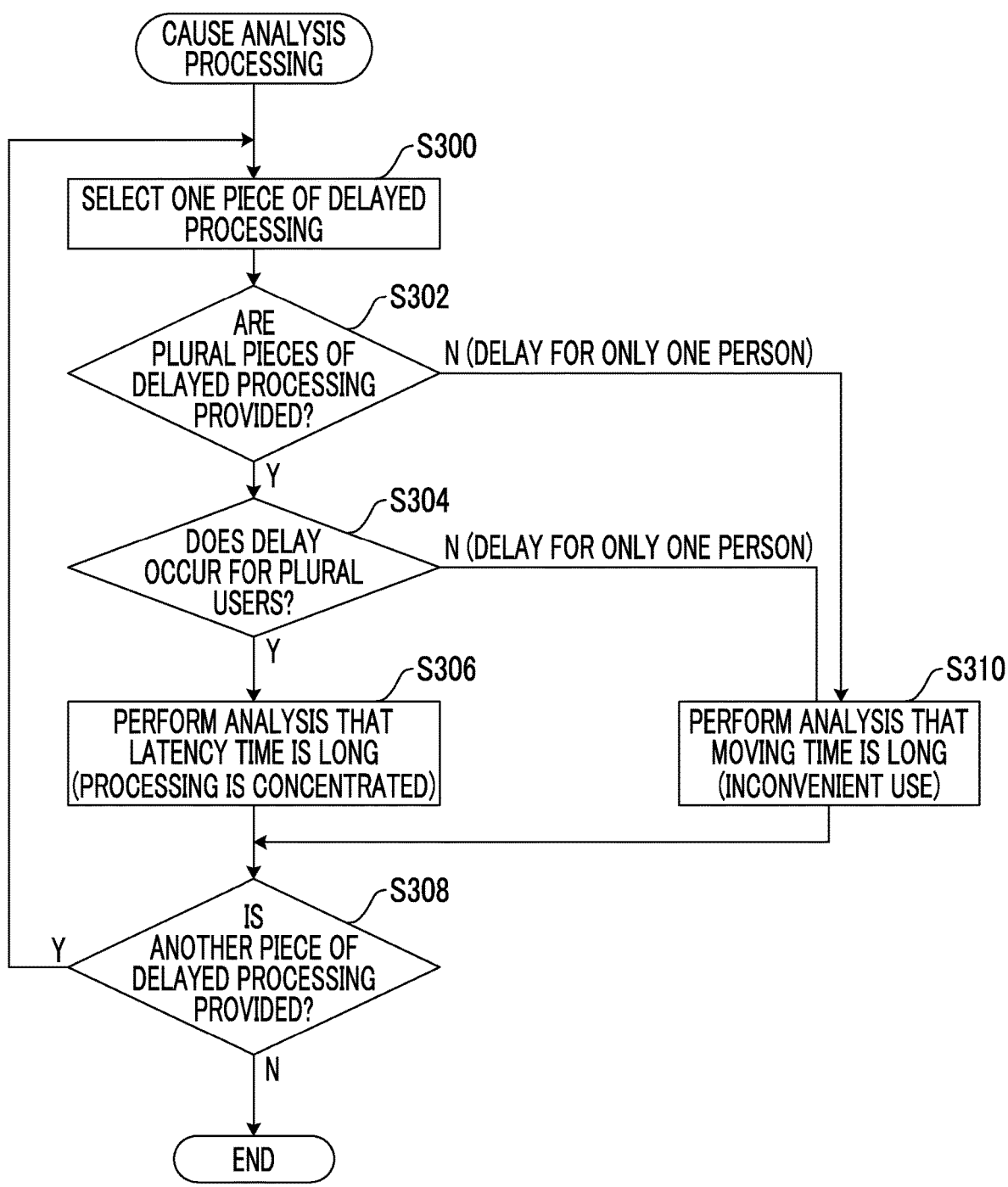
FIG. 10 is a flowchart illustrating an example of a flow of "cause analysis processing"

FIG. 10 is a flowchart illustrating an example of a flow of "the cause analysis processing". As illustrated in FIG. 10, firstly, in Step 300, one piece of delayed processing is selected. For example, delayed processing may be selected in an ascending order from Processing 1 (see FIG. 9). In Step 302, it is determined whether or not plural pieces of processing which are the same as processing related to the selected delayed processing are delayed. In a case where plural pieces of delayed processing are the same as each other, the process proceeds to Step 304.

In a case where the same delayed processing is not plural, that is, in a case where processing by only one user who has performed an instruction to perform the selected delayed processing is delayed, the process proceeds to Step 310. In Step 310, it is analyzed that the cause of delay is the long moving time.

Then, in Step 304, it is determined whether or not processing which is the same as processing (device and function) relating to the selected delayed processing is delayed for plural users. In a case where the processing is delayed for the plural users, the process proceeds to Step 306. In Step 306, it is analyzed that the cause of delay is the long latency time.

In a case where processing is not delayed for the plural users, that is, in a case where processing by only one user who has performed an instruction to perform the selected delayed processing is delayed, the process proceeds to Step 310. In Step 310, it is analyzed that the cause of delay is the long moving time. A case where delay occurs by one user simultaneously requesting plural pieces of processing is not assumed to be considered. The user can predict delay of processing.

Then, in Step 308, it is determined whether or not another piece of delayed processing is provided. In a case where another delayed processing is not provided, the routine is ended. In a case where another piece of delayed processing is provided, the process returns to Step 300 and the procedure from Step 300 to Step 310 is repeated until the causes for all pieces of delayed processing are specified.

For example, in the example of the delayed processing list illustrated in FIG. 9, processing is concentrated on the processing device 12E. Processing 1, Processing 2, Processing 6, Processing 7, and Processing 10 are pieces of processing for normal printing, which use the color printing function of the processing device 12E. An instruction to perform Processing 1 and Processing 2 is performed by the user A. An instruction to perform Processing 6 is performed by the user B. An instruction to perform Processing 7 is performed by the user C. An instruction to perform Processing 10 is performed by the user D.

The processing device 12E is instructed to perform each of Processing 1, Processing 2, Processing 6, Processing 7, and Processing 10 around 9 o'clock. An instruction to perform the pieces of processing is performed in order of Processing 1→Processing 6→Processing 7→Processing 10→Processing 2. The processing device 12E starts processing in order of receiving an instruction to perform the processing. However, in a case where processing as a target of an instruction which has been previously received does not end, the next processing is not started.

In this example, the processing using the color printing function is concentrated on the processing device 12E and thus the latency time of the user becomes longer in a staggering manner and plural pieces of delayed processing are generated. In normal printing, the moving time is not included in the use history. It is assumed that the waiting time of the Processing 1 is 70 seconds, that is, long, but a time is taken to start the processing device 12 or return from a sleep mode in the Processing 1.

Processing 4, Processing 5, Processing 8, and Processing 9 are pieces of processing using the FAX function of the processing device 12E. An instruction to perform Processing 4 is performed by the user A. An instruction to perform Processing 5 is performed by the user B. An instruction to perform Processing 8 is performed by the user C. An instruction to perform Processing 9 is performed by the user D.

The processing device 12E is instructed to perform each of Processing 4, Processing 5, Processing 8, and Processing 9 around 9:30. An instruction to perform the pieces of processing is performed in order of Processing 9→Processing 8→Processing 5→Processing 4. The processing device 12E starts processing in order of receiving an instruction to perform the processing. However, in a case where processing as a target of an instruction which has been previously received does not end, the next processing is not started. In this example, the processing using the FAX function is concentrated on the processing device 12E and thus plural pieces of delayed processing are generated.

Processing 3 is processing for accumulation printing, which uses the color printing function of the processing device 12E. An instruction to perform Processing 3 is performed by the user A. Processing for other users is not delayed in the same time zone. Thus, it is specified that the waiting time is "the moving time". If moving starts just after an instruction to perform processing, the user A takes 45 seconds to move to the processing device 12E.

Notification Processing

Next, "the notification processing" will be described.

Figure 11:
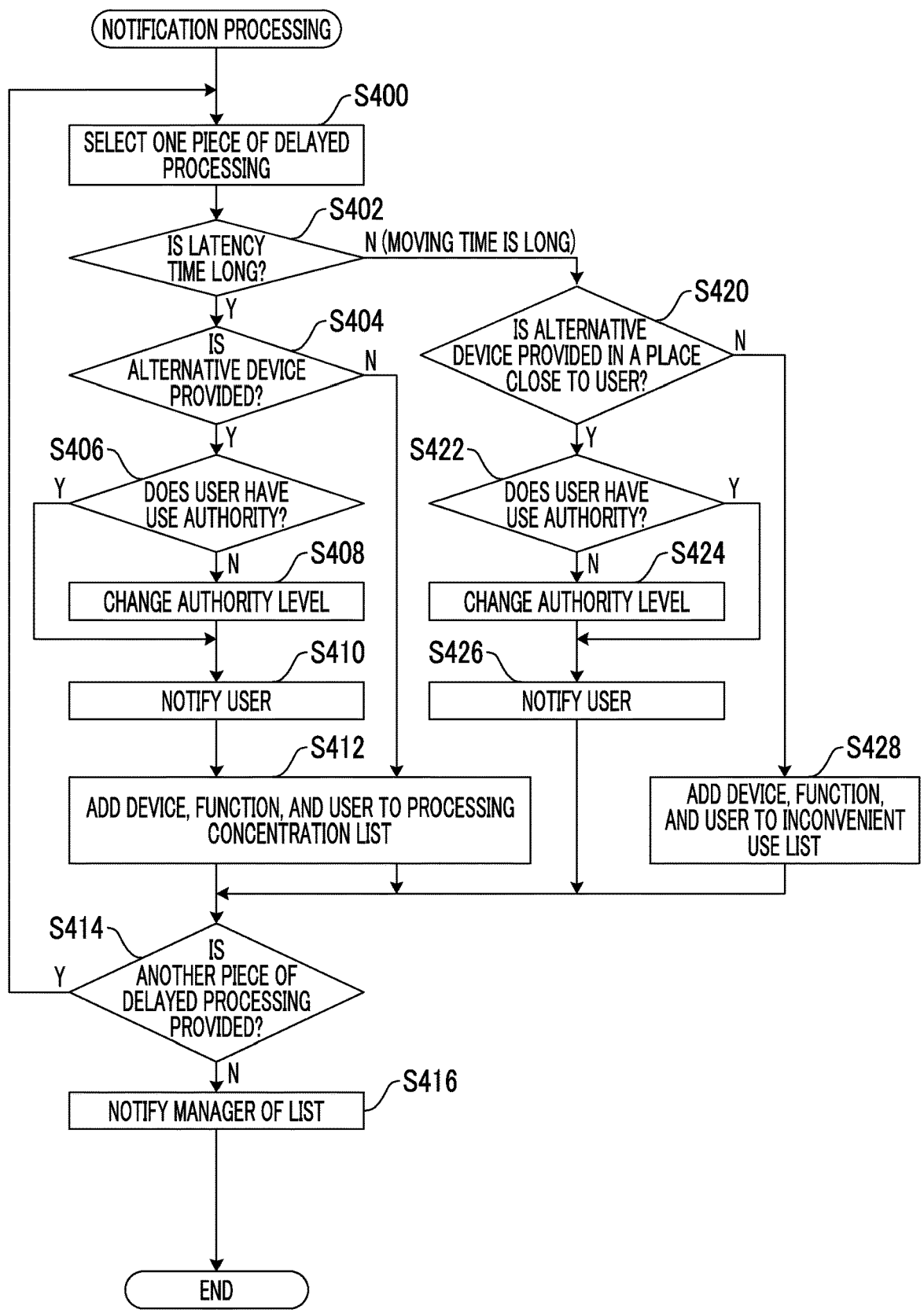
FIG. 11 is a flowchart illustrating an example of a flow of "notification processing"

FIG. 11 is a flowchart illustrating an example of a flow of "the notification processing". As illustrated in FIG. 11, firstly, in Step 400, one piece of delayed processing is selected. For example, as described above, delayed processing may be selected in an ascending order from Processing 1. In Step 402, it is determined whether or not the latency time is long. In a case where the latency time is long, the process proceeds to Step 404. In a case where the latency time is not long, the process proceeds to Step 420.

In Step 404, it is determined whether or not another processing device (alternative device) that is capable of performing processing which is the same as processing relating to the selected delayed processing is provided. It is determined whether or not the alternative device is provided, based on information regarding the functions of the plural processing devices. In a case where the alternative device is provided, the process proceeds to Step 406. In a case where the alternative device is not provided, the process proceeds to Step 412.

FIG. 12 is a table illustrating an example of information regarding the functions of the plural processing devices. As illustrated in FIG. 12, whether or not specific functions X, Y, and Z are provided is stored in advance in a table format, for each of the processing devices 12N, 12W, 12E, and 12S. In the example illustrated in FIG. 12, the function X is set to "the black-and-white printing" function, the function Y is set to "the color printing" function, and the function Z is set to "FAX" function.

For example, in a case where processing relating to the delayed processing is processing using the color printing function of the processing device 12E, it is determined that the alternative device is provided, since the processing device 12W also includes the color printing function. In a case where processing relating to the delayed processing is processing using the FAX function of the processing device 12E, it is determined that the alternative device is not provided, since another processing device 12 having the FAX function is not provided.

Then, in Step 406, it is determined whether or not the user who has performed an instruction to perform the delayed processing has a use authority for the alternative device. It is determined whether or not the user has the use authority, based on authority information for each of the plural processing devices of the plural users. In a case where the user does not have the use authority, the process proceeds to Step 408. In a case where the user has the use authority, the process proceeds to Step 410.

FIG. 13 is a table illustrating an example of pieces of authority information of the plural users for each of the plural processing devices. As illustrated in FIG. 13, regarding each of the users A, B, C, and D, a use authority level for each of the processing devices 12N, 12W, 12E, and 12S is stored in advance in a table format. In the example illustrated in FIG. 13, the use authority level rises in three levels from Level 1 to Level 3.

Level 1 is a level at which using a processing device as a target is not possible. Level 2 is a level at which using the color printing function of a processing device as a target is not possible. Even though the processing device as a target is instructed to perform processing using the color printing function, black-and-white printing is performed. Even in a case where the processing device as a target does not include the color printing function, the level is Level 2. Level 3 is a level at which using the color printing function of a processing device as a target is possible.

For example, in the above example, it is recognized that the processing device 12W is provided as the alternative device of the processing device 12E. Regarding the user A who has performed an instruction to perform the delayed processing, the use authority for processing device 12W is confirmed. The use authority level of the user A for the processing device 12W is "Level 2". The user A does not have an authority of using the color printing function of the processing device 12W.

Then, in Step 408, in a case where the user does not have the use authority, the use authority level is changed. That is, a management situation of the user is reexamined. For example, in the above example, the use authority level of the user A for the processing device 12W is raised from "Level 2" to "Level 3". Since the use authority level is changed in the management server 10, the user A performs color printings by using the processing device 12W.

In Step 410, the user who has performed an instruction to perform the delayed processing is notified of at least one of the analysis result or the countermeasure. For example, in the above example, the user A is notified of a message indicating "a long latency time", as analysis results for Processing 1 and Processing 2. The user A is notified of a message indicating that the processing device 12W having the color printing function is capable of being used as the alternative device, as the countermeasure based on the analysis results. The user is also notified of a message indicating that an authority of using the color printing function of the processing device 12W is granted.

As a method of notifying the user, a method of transmitting an E-mail to the terminal device 14 used by the user is exemplified. The notifying method is not limited thereto. In a case where the user is authenticated by the processing device, a guide screen including at least one of the analysis result or the countermeasure may be displayed in the operation display portion of the processing device.

In Step 412, the selected delayed processing (device, function, and user) is added to the processing concentration list. The process proceeds to Step 414. Even in a case where it is determined, in Step 404, that the alternative device is not provided, and the process proceeds from Step 404 to Step 412, the selected delayed processing is added to the processing concentration list in Step 412 and the process proceeds to Step 414.

FIG. 14 is a diagram illustrating an example of the processing concentration list. As illustrated in FIG. 14, two cases in which processing is concentrated are provided. One case corresponds to processing which uses the color printing function of the processing device 12E and is a target of an instruction from each of the users A, B, C, and D. The other case corresponds to processing which uses the FAX function of the processing device 12E and is a target of an instruction from each of the users A, B, C, and D.

In a case where the latency time is not long in Step 402, the process proceeds from Step 402 to Step 420. In a case where the latency time is not long, the moving time to the processing device is long. That is, the user uses the processing device disposed far from the user.

In Step 420, it is determined whether or not a processing device (alternative device) which is another processing device capable of performing the same processing as processing relating to the selected delayed processing and is closer to the user than the processing device that has performed the delayed processing is provided. In a case where the alternative device is provided, the process proceeds to Step 422. In a case where the alternative device is not provided, the process proceeds to Step 428.

FIG. 15 is a table illustrating an example of information regarding a required time to each of the plural processing devices. As illustrated in FIG. 15, regarding each of the users A, B, C, and D, a required time to each of the processing devices 12N, 12W, 12E, and 12S is stored in advance in a table format. Here, "the required time" has a calculated value of a time required in a case where the user moves to the processing device using the shortest path. "The required time" is obtained by dividing the length of the path by the walking speed.

FIG. 16 is a plan view illustrating a path from the user A to each of the processing devices. As illustrated in FIG. 16, the shortest path from the user A to the processing device 12N is "Path 1" indicated by a two-dot chain line. The required time in a case of moving to the processing device 12N by Path 1 is "$T_{m1}$". The shortest path from the user A to the processing device 12W is "Path 2" indicated by a solid line. The required time in a case of moving to the processing device 12W by Path 2 is "$T_{m2}$".

The shortest path from the user A to the processing device 12E is "Path 3" indicated by a one-dot chain line. The required time in a case of moving to the processing device 12E by Path 3 is "$T_{m3}$". The shortest path from the user A to the processing device 12S is "Path 4" indicated by a dotted line. The required time in a case of moving to the processing device 12S by Path 4 is "$T_{m4}$". Such a required time is stored in advance in the table illustrated in FIG. 15 and the like.

The path becomes shorter in order of Path 1>Path 3>Path 4>Path 2 and the required time is reduced in order of $T_{m1}>T_{m3}>T_{m4}>T_{m2}$. For example, in the above example, Processing 3 relating to the delayed processing is processing which uses the color printing function of the processing device 12E and is a target of an instruction from the user A.

Since the processing device 12W includes the color printing function and is closer to the user A than the processing device 12E, it is determined that the alternative device is provided. It is determined whether or not the processing device is close to the user A, based on determination of that the shortest distance from the user to the processing device is shorter than those of other processing devices or determination of that the required time from the user to the processing device is shorter than those of other processing devices.

Then, in Step 422, regarding the user who has performed an instruction to perform the delayed processing, it is determined whether or not the user has a use authority for the alternative device. In a case where the user does not have the use authority, the process proceeds to Step 424. In Step 424, the use authority level is changed. In a case where the user has the use authority, the process proceeds to Step 426.

In Step 426, the user who has performed an instruction to perform the delayed processing is notified of at least one of the analysis result or the countermeasure. For example, in the above example, the user A is notified of a message indicating "a long moving time", as the analysis result for Processing 3. The user A is notified of a message indicating that the processing device 12W closer to the user A than the processing device 12E is capable of being used as the alternative device, as the countermeasure based on the analysis result. The user is also notified of a message indicating that the authority is granted.

In a case where it is determined, in Step 420, that the alternative device is not provided, and the process proceeds from Step 420 to Step 428, the selected delayed processing (device, function, and user) is added to the "inconvenient use list" in Step 428. Then, the process proceeds to Step 414.

FIG. 17 is a diagram illustrating an example of the inconvenient use list. The delayed processing list illustrated in FIG. 9 does not include an example of "an inconvenient use" in which the alternative device is not provided. For example, regarding Processing 3 which uses the color printing function of the processing device 12E and is a target of an instruction from the user A, in a case where the processing device 12W as the alternative device is not provided, Processing 3 is added to the inconvenient use list, as illustrated in FIG. 17.

In Step 414, it is determined whether or not another piece of delayed processing is provided. In a case where another piece of delayed processing is not provided, the process proceeds to Step 416. In a case where another piece of delayed processing is provided, the process returns to Step 400 and the procedure from Step 400 to Step 428 is repeated until the notification processing is performed on all pieces of delayed processing. In Step 416, the manager is notified of the obtained lists (processing concentration list and inconvenient use list) and the routine is ended. The obtained lists are also stored in the storage device 16.

The manager is notified, for example, by displaying a screen including the obtained list or a link to the list, in the display portion of the management server 10. The manager starts the efficiency improvement processing program and waits for the notification of the list as a processing result.

The concentration of processing occurs mostly by ignorance or restriction, for example, that a user does not know about a long latency time, does not know about the alternative device, or does not have an authority to use the alternative device. In a case where the efficiency improvement processing program is executed, the user who has performed an instruction to perform the delayed processing is notified of at least one of the analysis result or the countermeasure and thus the inefficient use situation is improved.

The processing concentration list or the inconvenient use list is used for causing the manager to know a situation in which the device or the function is insufficient. For example, in a case where processing using the color printing function of the processing device 12E is often in the processing concentration list, it is estimated that it is difficult to distribute pieces of processing with the known processing device. In such a case, the manager examines addition of the device or the function, for example, replacement of the processing device, additional purchase of the processing device, and addition of the function.

In a case where addition of the device or the function is examined, the manager may perform various analyses based on use histories. For example, in a case where the processing using the color printing function of the processing device 12E is in "the processing concentration list", insufficiency of the color printing function is implied.

FIG. 18 is a graph illustrating the use ratios of each function in the entirety of the system. As illustrated in FIG. 18, in a case where the color printing function has a low use ratio in the entirety of the system, the corresponding device or function may not be added. On the contrary, in a case where the color printing function has a high use ratio in the entirety of the system, this supports that color printing is required many times but the number of processing devices including the color printing function is small. Thus, the color printing function or a device including the color printing function is added.

FIG. 19 is a graph illustrating the latency time of each function for each time zone. As illustrated in FIG. 19, for example, in a case where the latency time is long in the morning, but the latency time is halved in the afternoon even in a case of using any function, using in the afternoon may be recommended and the device or the function may not be added. For example, the case of the processing concentration list illustrated in FIG. 14 occurs in a time zone from 9 o'clock to 10 o'clock. Thus, all users may be recommended to use the device in the afternoon or may be informed of a specific time.

FIG. 20 is a graph illustrating the use ratio of each function of each of the devices. In the example illustrated in FIG. 20, the color printing is frequently performed in the processing device 12E. Although the processing device 12W also includes the color printing function, the color printing function is hardly used in the processing device 12W. Thus, the processing device 12W may be changed to a processing device which does not include the color printing function.

Regarding a user who performs black-and-white printing with the processing device 12E including the color printing function, it is confirmed whether or not the user has a use authority for another processing device including the black-and-white printing function. In a case where the user does not have the authority, the authority is granted to the user.

Focusing on the color printing function, it is estimated that the processing device 12W also includes the color printing function but has a difference in resolution, usability, and the like from the processing device 12E. For example, the usability changes depending on whether or not a post-processing device that performs post-processing such as stapling, drilling, and punching. In a case where the difference is not filled up, the replacement of the processing device, for example, a change to a processing device having the same model as the processing device 12E is examined.

In a case where processing which is performed by a specific processing device and is a target of an instruction from a specific user is not removed from the inconvenient use list, for example, a change of installation places of the plural processing devices is examined. For example, in the example illustrated in FIG. 16, only the processing device 12E includes the FAX function, and the users A, B, C, and D use the FAX function. Thus, in a case where the processing device 12E moves to the center of the area illustrated in FIG. 16, the required time of each of the users to the processing device 12E is reduced.

Modification Example

The configurations of the information processing apparatus, the program, and the management system described in the exemplary embodiment are just examples and may be changed in a range without departing from the gist of the present invention.

In the exemplary embodiment, a case of examining addition of the device or the function is described. However, an unnecessary device or function which is not used may be removed.

In the exemplary embodiment, a case where the manager is notified of "the processing concentration list" or "the inconvenient use list" is described. However, the manager may be notified of insufficiency of the device or the function or an inconvenient use situation of a user by a method different from the method of displaying the list. For example, the manager may be notified of the processing concentration list and "a proposal of adding a device or a function". The manager may be notified of the inconvenient use list and "a proposal of changing an installation place".

The inefficient use situation caused by ignorance or restriction is improved by executing the efficiency improvement processing program. Thus, in a case where the efficiency improvement processing program is executed for the second time or later, the manager may be notified of "the proposal of adding a device or a function" along with the processing concentration list or instead of the processing concentration list. Similarly, the manager may be notified of "the proposal of changing an installation place" along with the inconvenient use list or instead of the inconvenient use list.

As illustrated in FIGS. 4 and 16, in a case where recognizing position information of the user or the processing device is possible, changing an installation place may be proposed so as to move the specific processing device to the specific place. In a case where recognizing the position information is not possible, just a message of urging examination, for example, "Please consider changing the installation place" may be displayed.

In the exemplary embodiment, a case where the processing device is a multifunctional device is described. However, the processing device may be a device that performs processing in accordance with an instruction from each of plural users and is not limited to the multifunctional device. For example, there are many examples of the processing device, such as a projector that projects an image based on image data transmitted from a user and a vending machine that provides a product in a case where the product is selected and payment for the product is performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
extract delayed processing having a waiting time which is longer than a predetermined time, from a use history of each of a plurality of users using a plurality of processing devices, the waiting time being a time from performing of an instruction to perform processing to starting of performing the processing;
analyze a cause of the delayed processing; and
notify the user who has performed an instruction to perform the delayed processing, of at least one of an analysis result obtained by the processor or a countermeasure based on the analysis result,
wherein, in a case where plural pieces of delayed processing for a plurality of users in one processing device that has performed the delayed processing are extracted, the processor is further configured to perform analysis that the one processing device has a latency time longer than a threshold determined based on the use history,
wherein, in a case where it is determined that another processing device which is capable of performing the delayed processing is provided, based on information regarding a function of each of the plurality of processing devices, the processor is further configured to notify the user who has performed an instruction to perform the delayed processing, of that the other processing device is provided.

2. The information processing apparatus according to claim 1,
wherein the processor is further configured to notify the user who has performed an instruction to perform the delayed processing, of an analysis result that the one processing device has the latency time longer than the threshold determined based on the use history.

3. The information processing apparatus according to claim 1,
wherein, in a case where the user who performed an instruction to perform the delayed processing does not have an authority of using the other processing device, the processor is further configured to grant the authority of using the other processing device to the user who has performed an instruction to perform the delayed processing and notifies the user of a message indicating that the authority is granted to the user.

4. The information processing apparatus according to claim 2,
wherein, in a case where the user who performed an instruction to perform the delayed processing does not have an authority of using the other processing device, the processor is further configured to grant the authority of using the other processing device to the user who has performed an instruction to perform the delayed processing and notifies the user of a message indicating that the authority is granted to the user.

5. The information processing apparatus according to claim 1, wherein, in a case where the other processing device is not provided, the processor is further configured to notify a manager of a lack of at least one of a device or a function relating to the delayed processing.

6. The information processing apparatus according to claim 2,
wherein, in a case where the other processing device is not provided, the processor is further configured to notify a manager of a lack of at least one of a device or a function relating to the delayed processing.

7. The information processing apparatus according to claim 3,
wherein, in a case where the other processing device is not provided, the processor is further configured to notify a manager of a lack of at least one of a device or a function relating to the delayed processing.

8. The information processing apparatus according to claim 4,
wherein, in a case where the other processing device is not provided, the processor is further configured to notify a manager of a lack of at least one of a device or a function relating to the delayed processing.

9. The information processing apparatus according to claim 1,
wherein, in a case where at least one piece of delayed processing for one user in one processing device that has performed the delayed processing is extracted, the processor is further configured to analyze that a moving time to the one processing device is long.

10. The information processing apparatus according to claim 9,
wherein the processor is further configured to notify the one user of an analysis result that the moving time to the one processing device is long.

11. The information processing apparatus according to claim 9,
wherein, in a case where it is determined that a closest processing device which is capable of performing the delayed processing and is closer to the one user than the one processing device that has performed the delayed processing is provided, based on information regarding a function of each of the plurality of processing devices and information regarding a required time to each of the plurality of processing devices, the processor is further configured to notify the one user of that the closest processing device is provided.

12. The information processing apparatus according to claim 10,
wherein, in a case where it is determined that a closest processing device which is capable of performing the delayed processing and is closer to the one user than the one processing device that has performed the delayed processing is provided, based on information regarding a function of each of the plurality of processing devices and information regarding a required time to each of the plurality of processing devices, the processor is further configured to notify the one user of that the closest processing device is provided.

13. The information processing apparatus according to claim 11,
wherein, in a case where the one user does not have an authority of using the closest processing device, the processor is further configured to grant the authority of using the closest processing device to the one user and notifies the user of a message indicating that the authority is granted to the user.

14. The information processing apparatus according to claim 12,
wherein, in a case where the one user does not have an authority of using the closest processing device, the processor is further configured to grant the authority of using the closest processing device to the one user and notifies the user of a message indicating that the authority is granted to the user.

15. The information processing apparatus according to claim 11,
wherein, in a case where the closest processing device is not provided, the processor is further configured to notify a manager of an inconvenient use situation of the user.

16. A non-transitory computer readable medium storing a program causing a computer to function as:
the processor of the information processing apparatus according to claim 1.

17. A management system comprising:
the information processing apparatus according to claim 1;
a plurality of processing devices which are managed by the information processing apparatus; and
a plurality of terminal devices which are respectively used by a plurality of users.

* * * * *